Nov. 1, 1949.   J. J. KOJAN ET AL   2,486,565
CLAMPING RING FOR METAL CONTAINERS
Filed April 3, 1947
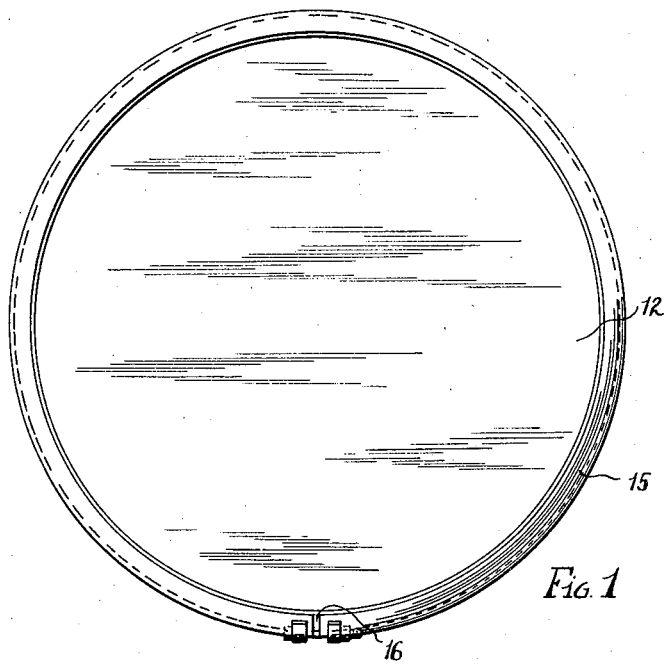
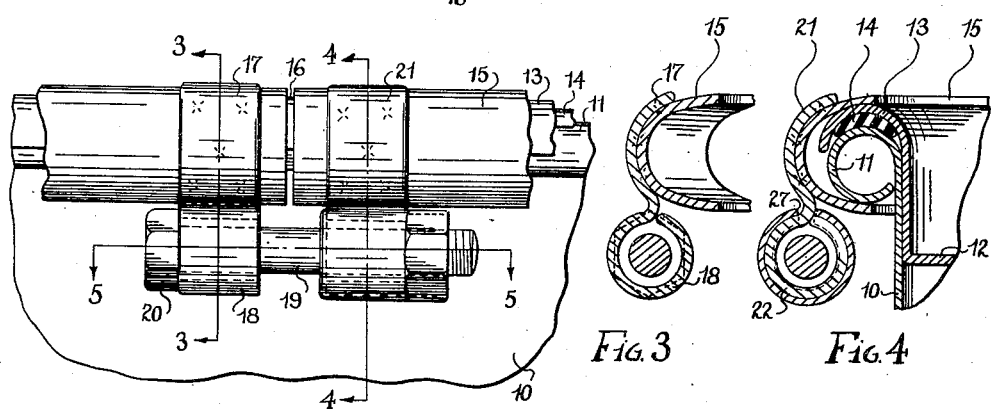
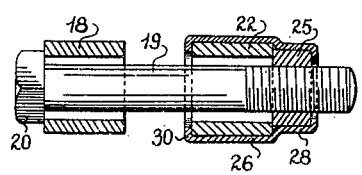
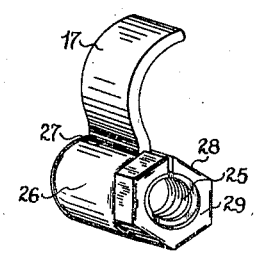
INVENTOR.
JOHN J. KOJAN.
BY LEO A. WITUCKY
Kwis, Hudson, Boughton & Williams
ATTORNEYS Patented Nov. 1, 1949

2,486,565

UNITED STATES PATENT OFFICE 2,486,565

CLAMPING RING FOR METAL CONTAINERS

John J. Kojan, Bedford, and Leo A. Witucky, Cleveland, Ohio

Application April 3, 1947, Serial No. 739,192

2 Claims. (Cl. 24—19)

This invention relates to improvements in clamping rings for metal containers, particularly sheet metal barrels, drums and pails. The invention has to do primarily with means for mounting the nut of a bolt and nut closing and holding device for such a clamping ring.

One of the objects of the invention is the provision of economical means for mounting and hoding against rotation the nut of a bolt and nut closing and holding couple for a clamping ring of the character stated.

Other objects and features of novelty will appear as we proceed with the description of that embodiment of the invention which, for the purposes of the present application, we have illustrated in the accompanying drawing, in which Fig. 1 is a plan view of a sheet metal container provided with a clamping ring for closing the container and sealing the lid thereto.

Fig. 2 is a fragmental elevational view on a larger scale showing the parts in positions they occupy when the container is closed and sealed.

Figs. 3 and 4 are vertical sectional views taken substantially on the lines 3—3 and 4—4 of Fig. 2.

Fig. 5 is a horizontal sectional view taken substantially on the line 5—5 of Fig. 2, and Fig. 6 is a perspective view of the nut and lug assembly ready to be welded to the ring.

In the drawing 10 represents a sheet metal container having one open end and provided at that end with a rolled edge forming a bead 11. A lid 12 projects into the open end of the container. It has a curved rim 13, see Fig. 4, within the concavity of which there is mounted a soft rubber gasket 14 that engages the top of the bead 11.

15 is a one piece clamping ring with a split indicated at 16 in Figs. 1 and 2. This ring is C-shaped in cross-section and embraces the bead 11 and the rim 13, and thus when contracted exerts force compressing gasket 14 and sealing the container.

A lug 17 of heavy sheet metal curved to a contour similar to that of the external surface of the ring is welded to the ring near one end thereof. Beyond the portion of this lug which is to be attached to the ring the lug is rolled to form a substantially cylindrical loop 18. When the lug is mounted upon the ring this loop is offset downwardly from the ring proper. The internal diameter of the loop is somewhat greater than the diameter of the shank of the bolt 19, which forms part of the ring clamping means, but is small enough to form an abutment for the head 20 of the bolt.

A second lug 21, which may be identical with lug 17, is welded or otherwise attached to the ring 15 on the opposite side of the split 16. It comprises an offset cylindrical loop 22 which may be identical with loop 18. These two loops in the closed condition of the container are substantially in alignment, but any slight deviation from alignment is unimportant in view of the clearance between the bolt and the loops.

A sheet metal envelope is provided to hold a nut 25 upon loop 22. This envelope comprises a cylindrical portion 26 which surrounds the loop but has a slot 27 for clearing the lug 21 and enabling the envelope to be slipped over the loop in assembly. The envelope also comprises an extension 28 which is formed to receive nut 25 and hold it against rotation. This extension has an inturned flange 29 which is formed to constitute an abutment for the outer end of the nut. In the assembly of the device the nut 25 may be dropped into the envelope through the cylindrical part 26 thereof into the formed extension 28. Then, with the nut thus in place, the envelope may be slipped over the loop 22, the slot 27 receiving the lug 17. Nut 25 will then be held between the flange 29 on the envelope and the end wall of loop 22. The cylindrical part 26 of the envelope is made long enough so that when the parts are thus in position the left hand extremity of the envelope as viewed in Figs 1, 2 and 6 may be peened over to form an annular flange 30 bearing against the outer end wall of the loop. The parts are thus very readily assembled and the nut is positively locked against rotating movement and movement axially of the bolt.

Having thus described our invention, we claim:

1. A split ring clamp for closing and sealing sheet metal containers, comprising two lugs rigid with the ring, one on each side of its split, each of said lugs having an integral part rolled into a cylindrical loop offset from the ring, a nut disposed adjacent to and axial with one of said loops, a sheet metal envelope surrounding said last named loop and nut and shaped to conform with the perimeters thereof, said envelope overlapping the outer end surfaces of said loop and nut and flanged inwardly thereover, and a bolt projected through said loops and threaded into said nut.

2. A split ring clamp for closing and sealing sheet metal containers, comprising two lugs rigid with the ring, one on each side of its split, each of said lugs having an integral part rolled into a cylindrical loop offset from the ring, a nut disposed adjacent to and axial with one of said loops, a sheet metal envelope of generally cylindrical form surrounding said last named loop and having a slot therein to clear the corresponding lug, said envelope having a lateral extension to one side of the loop formed to receive said nut and hold it against turning and against outward axial movement, the remaining portion of the envelope having an internal diameter greater than the maximum dimension of the nut, whereby in the assembly of the device the nut may be inserted through the latter portion into the said extension before the envelope is slipped over the loop, the internal diameter of the loop being less than the maximum dimension of the nut, means for securing said envelope to said loop, and a bolt projected through said loop and threaded into said nut.

JOHN J. KOJAN.
LEO A. WITUCKY.

REFERENCES CITED

The following references are of record in the file of this patent:

UNITED STATES PATENTS

| Number | Name | Date |
| --- | --- | --- |
| 1,122,854 | Campbell | Dec. 29, 1914 |
| 2,111,696 | Sherman | Mar. 22, 1938 |
| 2,115,361 | Daggett | Apr. 26, 1938 |
| 2,390,838 | Johnson | Dec. 11, 1945 |